(12) United States Patent
Huang

(10) Patent No.: US 8,292,667 B1
(45) Date of Patent: Oct. 23, 2012

(54) CARD CONNECTOR

(75) Inventor: Sheng-Yuan Huang, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/198,699

(22) Filed: Aug. 4, 2011

(51) Int. Cl.
*H01R 24/00* (2011.01)

(52) U.S. Cl. ..................... 439/630; 439/541.5

(58) Field of Classification Search ............ 439/630, 439/541.5, 731, 687, 696, 465
See application file for complete search history.

(56) References Cited

U.S. PATENT DOCUMENTS

| 6,386,920 B1 * | 5/2002 | Sun ................. 439/630 |
| 2006/0178045 A1 * | 8/2006 | Ting ............... 439/541.5 |

* cited by examiner

*Primary Examiner* — Renee S Luebke
*Assistant Examiner* — Harshad Patel
(74) *Attorney, Agent, or Firm* — Cheng-Ju Chiang

(57) ABSTRACT

A card connector comprises a housing and plural conductive terminals accommodated in the housing. The housing comprises an upper housing and a lower housing connected to each other. The upper and lower housings form a first opening and a second opening which are stacked. The first and second openings are communicated to form an accommodating space. At least two electrical cards placed one above the other are accommodated in the accommodating space. The conductive terminals comprise a first set of conductive terminals and a second set of conductive terminals. An upper inner wall of the upper housing and a lower inner wall of the lower housing respectively have plural terminal slots disposed thereon for accommodating the first and second sets of conductive terminals. The card connector can accommodate two pieces of electrical cards, has a compact structure, and is capable of saving spaces of a device.

9 Claims, 5 Drawing Sheets

US 8,292,667 B1

CARD CONNECTOR

TECHNICAL FIELD OF THE INVENTION

The present invention relates to a connector, and more particularly, to a SIM (subscriber identity module) card connector.

BACKGROUND OF THE INVENTION

The SIM card connector is widely used in an electronic communication device such as a mobile phone. The SIM card connector is assembled on a circuit board. A SIM card is provided to be inserted into the SIM card such that an electronic transmission between the SIM card and the circuit board is achieved and thereby data identification is fulfilled.

FIG. 1 is a diagram showing a conventional SIM card connector 50. The conventional SIM card connector 50 comprises a housing 51 and a plurality of slots 511 formed on a bottom wall of the housing 51. The slots 511 are engaged with a plurality of conductive terminals 512 which are welded on a circuit board (not shown) and electrically connected to the circuit board. The SIM card connector 50 further comprises a fastening member 52. The bottom wall and lateral walls of the housing 51 and the fastening member 52 construct a stable insertion space which is provided for inserting a SIM card 53 thereto.

However, electronic communication devices such as mobile phones are gradually developed to be light, thin, and delicate today. SIM card connectors used in the mobile phones also should adapt to this tendency and become light, thin, and delicate. The above mentioned conventional SIM card connector 50 is too big and it needs to occupy a larger room of the electronic communication device, and therefore it does not serve current demands. In addition, the conventional SIM card connector 50 merely provides an insertion for one SIM card and thus it can not satisfy the demands on a function of "dual card dual standby" of current mobile phones.

SUMMARY OF THE INVENTION

The objective of the present invention is to provide a card connector capable of accommodating two pieces of electrical cards and having a compact structure for improving the above mentioned conventional skills.

To achieve the above objective, a card connector provided in the present invention comprises a housing and a plurality of conductive terminals accommodated in the housing. The housing comprises an upper housing and a lower housing connected to each other. The upper housing and the lower housing form a first opening and a second opening which are stacked. The first opening and the second opening are communicated to form an accommodating space. At least two electrical cards placed one above the other are accommodated in the accommodating space. The conductive terminals comprise a first set of conductive terminals and a second set of conductive terminals. An upper inner wall of the upper housing and a lower inner wall of the lower housing respectively have a plurality of terminal slots disposed thereon for accommodating the first set of conductive terminals and the second set of conductive terminals.

As described above, the card connector of the present invention is a compact structure. The housing of the card connector is constructed by assembling the upper housing and the lower housing. The card connector can be provided for two pieces of electrical cards. To be in use, the electrical cards are inserted into the card connector from the same direction such that a function of "dual card dual standby" is achieved in electronic communication devices such as cell phones. Meanwhile, the structure of the present invention is compact and is capable of saving inner spaces of cell phones or other electronic communication devices, which are becoming light and thin gradually. Also, after the electrical cards are inserted into the housing of the card connector of the present invention, the contact between the electrical cards and the conductive terminals is stable such that an excellent electronic transmission is assured.

DETAILED DESCRIPTION OF THE INVENTION

In order to illustrate the techniques, structural features, achieved objectives and effects of the present invention in details, embodiments are provided in conjunction with drawings and are described as follows.

Figure 1:
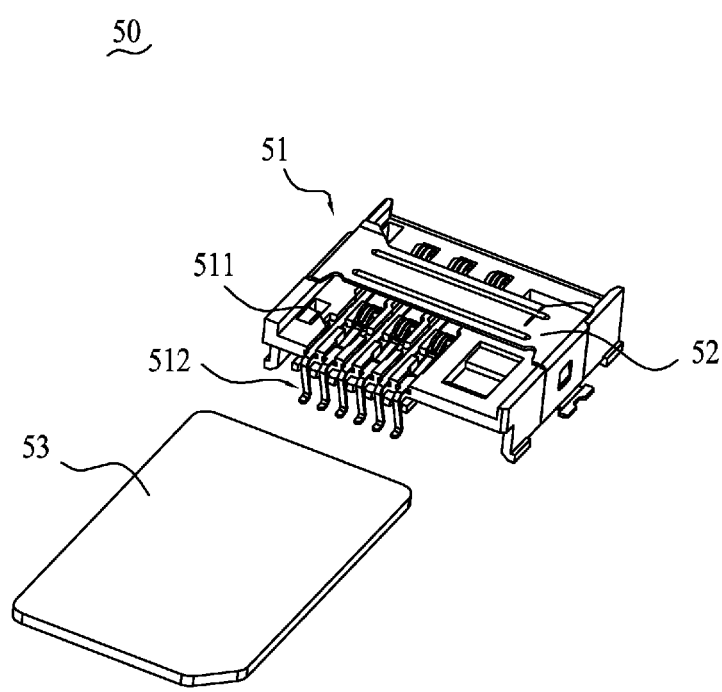
FIG. 1 is a perspective view of a conventional SIM card connector.
Figure 2:
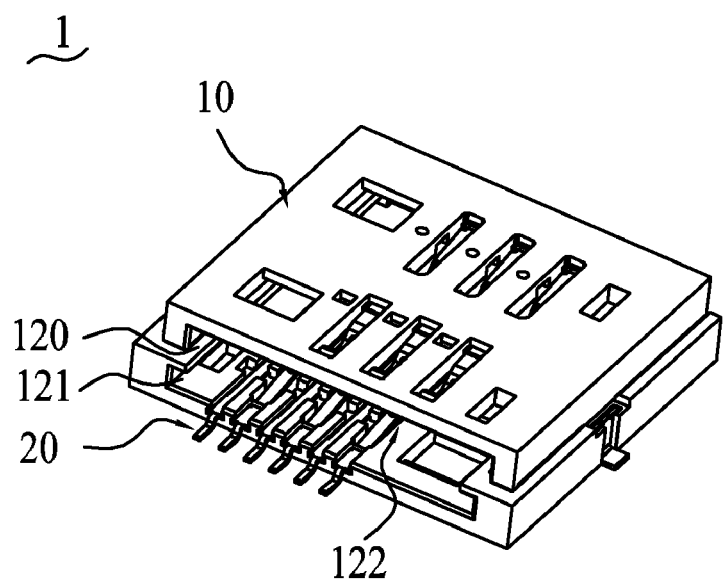
FIG. 2 is a perspective view of a card connector in accordance with one embodiment of the present invention.
Figure 3:
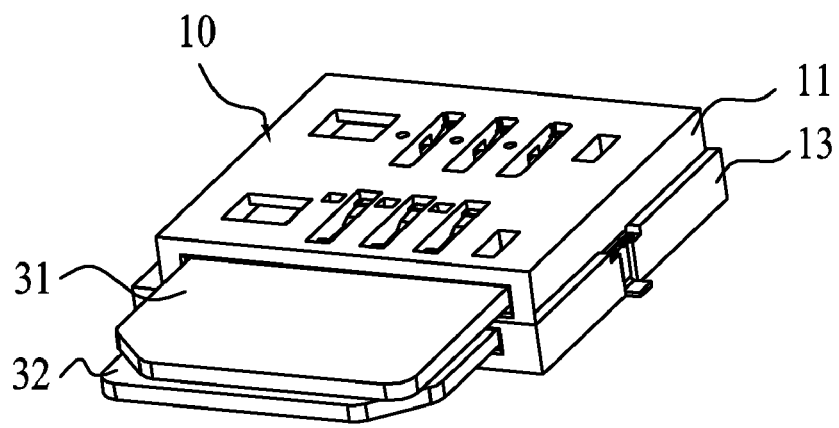
FIG. 3 is a perspective view of the card connector shown in FIG. 2 with accompanied SIM cards.
Figure 4:
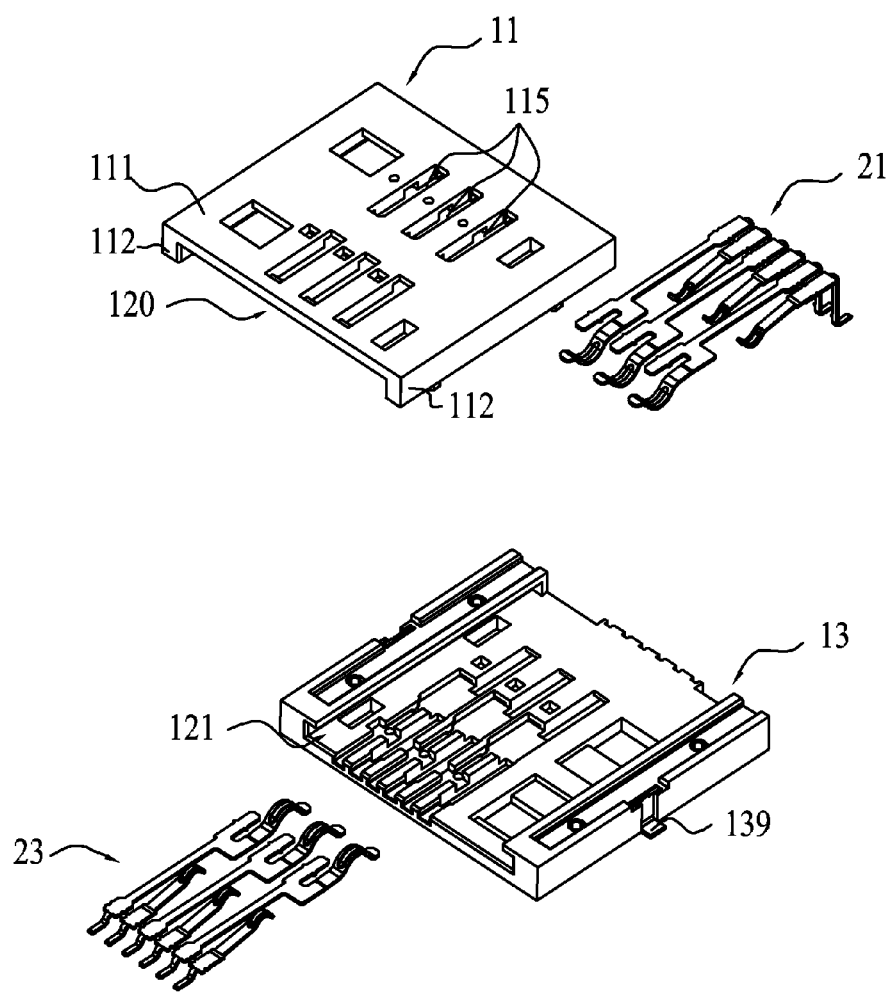
FIG. 4 is an exploded view of the card connector shown in FIG. 2.
Figure 5:
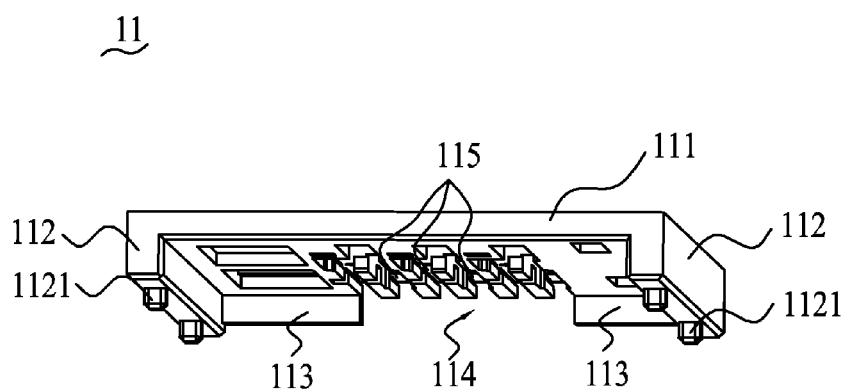
FIG. 5 is a perspective view of an upper housing of the card connector shown in FIG. 4.

Referring to FIG. 2 to FIG. 4, a card connector 1 of the present invention comprises a housing 10 and a plurality of conductive terminals 20. These conductive terminals 20 have one end accommodated in the housing 10 for being in contact with one or more electrical cards and another end extending to an area outside the housing 10 for being welded to an external circuit board (not shown). In the following embodiments, the electrical card is a SIM card for example. When the SIM card is inserted to be in use, an electric effective portion on the SIM card will touch the conductive terminals 20, and thereby an electrical connection is formed between the SIM card and the external circuit board. In the present invention, the SIM card connector 1 can be provided for two pieces of SIM cards, e.g., a first SIM card 31 and a second SIM card 32 as shown in FIG. 3, such that a function of "dual card dual standby" can be achieved in cell phones or other electronic communication devices.

Referring to FIG. 2 to FIG. 5, the housing 10 substantially has a shape of cuboid. The housing 10 comprises an upper housing 11 and a lower housing 13 that are assembled together in an upward or downward direction. The assembly of the upper housing 11 and the lower housing 13 forms a first opening 120 and a second opening 121 which are stacked. The first opening 120 and the second opening 121 are communicated to form an accommodating space 122 which is provided for the two SIM cards 31/32 to be inserted thereto. It is preferred that the first opening 120 and the second 121 are located at the same side of the housing 10. Specifically, referring to FIG. 4 and FIG. 5, the upper housing 11 appears to be a semi-enclosed shape. The upper housing 11 has a top surface 111 and matching portions 112 formed by extending downward respectively from left and right edges of the top surface 111. The upper housing 11 also has two separated stoppers 113 formed in the rear of the top surface 111. The stoppers 113 are joined to the matching portions 112 and a breach 114 is formed between the two stoppers 113. When inserting the SIM cards, a tail of the first SIM card 31 will be held or stopped by the stoppers 113. The matching portions 112 have at least a stick 1121 disposed thereon. The stick 1121 is accompanied for assembling the upper housing 11 and the lower housing 13. The top surface 111 of the upper housing 11 has a plurality of terminal slots 115 disposed on an inner wall thereof. The terminal slots 115 are used for accommodating a first set of conductive terminals 21. Preferredly, the terminal slots 115 are extended to the rear of the upper housing 11 such that an end of each conductive terminal in the first set of conductive terminals 21 is accommodated in the terminal slots 115 and another end thereof is extended to a rear area outside the upper housing 11 to connect the external circuit board.

Figure 6:
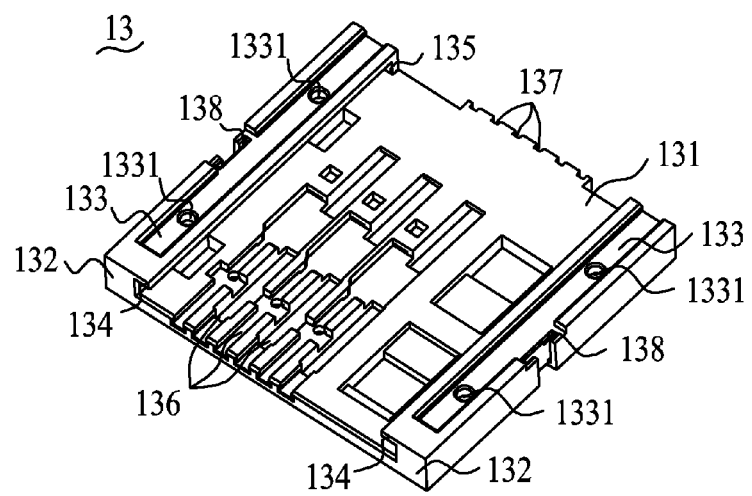
FIG. 6 is a perspective view of a lower housing of the card connector shown in FIG. 4.

Referring to FIG. 6, similarly, the lower housing 13 also appears to be a semi-enclosed shape. The lower housing 13 comprises a bottom surface 131 and assembling portions 132 formed by extending upward respectively from left and right edges of the bottom surface 131. Each of the assembling portions 132 has a fixing recess 133 disposed thereon for engaging with the matching portions 112 of the upper housing 11. It is preferred that the fixing recess 133 has a plurality of bores 1331 disposed corresponding to the positions of the sticks 1121 of the matching portions 112. When assembling the upper housing 11 and the lower housing 13, the sticks 1121 are engaged with the bores 1331 and thereby achieving a detachable connection. The assembly of the upper housing 11 and the lower housing 13 is not limited to above approaches. Screws or other fastening members can be implemented as well.

Each assembling portion 131 has an extending portion 134 formed by extending from an inner wall to an interior point. The extending portion 134 has a predetermined thickness. When the first SIM card 31 and the second SIM card 32 are inserted into the housing 10 respectively from the first opening 120 and the second opening 121, the extending portion 134 is located between the first SIM card 31 and the second SIM card 32. In addition, the lower housing 13 has stopping portions 135 disposed respectively at two sides of the rear thereof. Each stopping portion 135 is connected to one extending portion 134 such that the extending portions 134 and the stopping portions 135 accompany respectively with the inner walls of the two sides of the lower housing to form grooves. When the second SIM card 32 is inserted, a tail of the second SIM card 32 will be held or stopped by the stopping portions 135.

As shown in FIG. 6, the bottom surface 131 of the lower housing 13 has a plurality of terminal slots 136 disposed on an inner wall thereof. The terminal slots 136 are used for accommodating a second set of conductive terminals 23. Preferredly, the terminal slots 136 are extended to the front of the lower housing 13 such that an end of each conductive terminal in the second set of conductive terminals 23 is accommodated in the terminal slots 136 and another end thereof is extended to a front area outside the lower housing 13 to connect the external circuit board. In addition, the bottom surface 131 of the lower housing 13 further has a plurality of notches 137 disposed at a fringe of the rear thereof. When the upper housing 11 having the first set of conductive terminals 21 accommodated therein is assembled to the lower housing 13, the notches 137 are engaged with end portions of the first set of conductive terminals 21 such that it is convenient to weld the first set of conductive terminals 21.

The assembling portions 132 have troughs 138 respectively disposed at two sides of the lower housing 13. An L-shaped fastening slice 139 (see FIG. 4) has one end embedded in one trough 138 and another end extending to an area outside the assembling portions 132.

Figure 7:
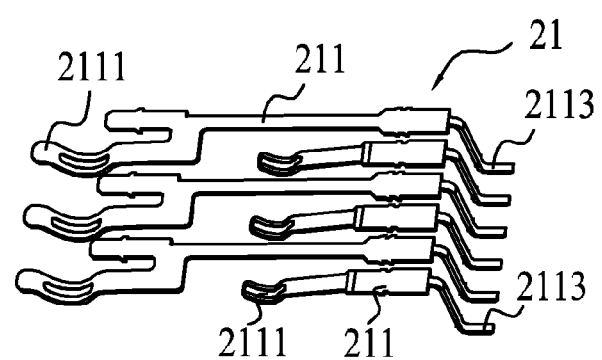
FIG. 7 is a perspective view of conductive terminals of the card connector shown in FIG. 4.
Figure 7:
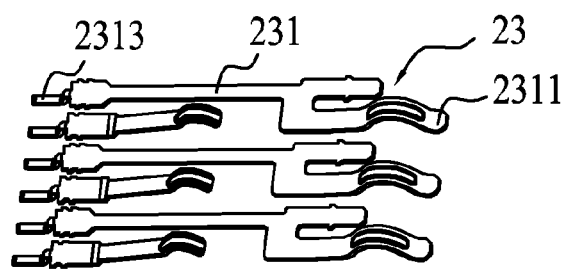

FIG. 7 is a diagram showing the conductive terminals 20 of the present invention. As described above, the conductive terminals 20 comprise the first set of conductive terminal 21 and the second set of conductive terminal 23. The structure of the first set of conductive terminal 21 is substantially identical to that of the second set of conductive terminal 23.

Referring to FIG. 7, the first set of conductive terminals 21 comprises a plurality of independent conductive terminal entities 211. Each of the conductive terminal entities 211 comprises a first contact end 2111 and a first welding end 2113. The first contact end 2111 is flexible and can be implemented by a flexible arm. When the first contact end 2111 touches the first SIM card 31, the first contact end 2111 will be flexed and deformed such that an excellent contact is achieved. The first welding end 2113 is extended to an area outside the housing 10 and is welded to the external circuit board. The shape or length of the conductive terminal entities 211 can be altered as required and the present embodiment is not limited thereto. Similarly, the second set of conductive terminals 23 comprises a plurality of independent conductive terminal entities 231. Each of the conductive terminal entities 231 comprises a second contact end 2311 and a second welding end 2313.

Above all, the housing 10 of the card connector 1 of the present invention is constructed by assembling the upper housing 11 and the lower housing 13. The card connector 1 can be provided for two pieces of SIM cards. To be in use, the SIM cards are inserted into the card connector 1 from the same direction such that a function of "dual card dual standby" is achieved in cell phones or other electronic communication devices. Meanwhile, the structure of the present invention is compact and is capable of saving inner spaces of cell phones or other electronic communication devices, which are becoming light and thin gradually. Also, after the SIM cards are inserted into the housing 10 of the card connector 1 of the present invention, the contact between the SIM cards and the conductive terminals 20 is stable such that an excellent electronic transmission is assured.

What is claimed is:

1. A card connector, comprising a housing and a plurality of conductive terminals accommodated in the housing, wherein the housing comprises an upper housing and a lower housing connected to each other, the upper housing and the lower housing form a first opening and a second opening which are stacked, the first opening and the second opening are communicated to form an accommodating space, at least two electrical cards placed one above the other are accommodated in the accommodating space, the conductive terminals comprise a first set of conductive terminals and a second set of conductive terminals, an upper inner wall of the upper housing and a lower inner wall of the lower housing respectively have a plurality of terminal slots disposed thereon for accommodating the first set of conductive terminals and the second set of conductive terminals, wherein the lower housing has extending portions respectively disposed on a left inner wall and a right inner wall of the lower housing, the extending portions extend to a center of the accommodating space, the extending portions are located between the two electrical cards when the two electrical cards are inserted into the accommodating space.

2. The card connector according to claim 1, wherein the first opening and the second opening are located at a same side of the housing.

3. The card connector according to claim 1, wherein the at least two electrical cards are inserted into the accommodating space respectively via the first opening and the second opening.

4. The card connector according to claim 1, wherein the upper housing comprises a top surface and two matching portions formed by extending downward respectively from two edges of the top surface.

5. The card connector according to claim 4, wherein the lower housing comprises a bottom surface and two assembling portions formed by extending upward respectively from two edges of the bottom surface, and the assembling portions and the matching portions are connected together.

6. The card connector according to claim 5, wherein the assembling portions have two fixing recesses disposed thereon for engaging with the matching portions.

7. The card connector according to claim 6, wherein the matching portions have a plurality of sticks disposed thereon and the fixing recesses have a plurality of bores corresponding to the sticks.

8. The card connector according to claim 1, further comprising at least a fastening slice connecting to the lower housing.

9. The card connector according to claim 8, wherein the lower housing has troughs respectively disposed on two sides thereof, the fastening slice has one end embedded in one of the troughs and another end extending to an area outside the lower housing.

* * * * *